US008355979B2

(12) United States Patent
Capuano et al.

(10) Patent No.: US 8,355,979 B2
(45) Date of Patent: Jan. 15, 2013

(54) SYSTEMS AND METHODS FOR MAINTAINING ANONYMITY IN A GAMING OR OTHER ENVIRONMENT

(75) Inventors: John Capuano, Chatham, NJ (US); Antonio Papageorgiou, Bronk, NY (US)

(73) Assignee: BGC Partners, Inc., New York, NY (US)

( * ) Notice: Subject to any disclaimer, the term of this patent is extended or adjusted under 35 U.S.C. 154(b) by 1571 days.

(21) Appl. No.: 11/741,132

(22) Filed: Apr. 27, 2007

(65) Prior Publication Data

US 2007/0255643 A1 Nov. 1, 2007

Related U.S. Application Data

(60) Provisional application No. 60/745,841, filed on Apr. 27, 2006.

(51) Int. Cl.
*G06Q 40/00* (2012.01)

(52) U.S. Cl. ........................................ 705/37; 705/35

(58) Field of Classification Search ............... 705/35–37
See application file for complete search history.

(56) References Cited

U.S. PATENT DOCUMENTS

| | | | | |
|---|---|---|---|---|
| 7,533,054 | B2 * | 5/2009 | Hausman et al. | 705/37 |
| 7,680,715 | B2 * | 3/2010 | Waelbroeck et al. | 705/35 |
| 7,693,774 | B2 * | 4/2010 | Howorka et al. | 705/37 |
| 7,908,198 | B1 * | 3/2011 | Keith | 705/37 |
| 2002/0069210 | A1 | 6/2002 | Navani et al. | |
| 2002/0111210 | A1 | 8/2002 | Luciano | |
| 2002/0116317 | A1 * | 8/2002 | May | 705/37 |
| 2002/0133455 | A1 * | 9/2002 | Howorka et al. | 705/37 |
| 2003/0093343 | A1 * | 5/2003 | Huttenlocher et al. | 705/35 |
| 2003/0093360 | A1 * | 5/2003 | May | 705/37 |
| 2003/0195037 | A1 | 10/2003 | Vuong et al. | |
| 2003/0216962 | A1 | 11/2003 | Heller et al. | |
| 2005/0071481 | A1 | 3/2005 | Danieli | |

(Continued)

FOREIGN PATENT DOCUMENTS

WO WO 99/19821 4/1999

(Continued)

OTHER PUBLICATIONS

Examiners 2$^{nd}$ Report for AU Application No. 2010219359 dated Sep. 13, 2011; 3 pages.
PCT Search Report for PCT Application No. PCT/US07/67647 dated Nov. 2, 2007; 3 pages.
PCT Written Opinion for PCT Application No. PCT/US07/67647 dated Nov. 2, 2007; 7 pages.
Examiners Report for AU Application No. 2010219359 dated May 26, 2011; 2 pages.

(Continued)

*Primary Examiner* — Jagdish Patel
*Assistant Examiner* — Sara C Hamilton

(57) ABSTRACT

The present application provides methods and systems for maintaining anonymity in a gaming environment that include or perform the step or steps of receiving a user preference from a first user for maintaining an identity of the first user anonymous during at least one game; tracking game play involving the first user and at least one other user; receiving a request from the at least one other user to initiate at least one game with the first user; retrieving game history data specific to the first user and the at least one other user; retrieving at least one rule for controlling interactions between anonymous users and the at least one other user in the gaming environment; and disposing the request to initiate the at least one game with the first user based at least on the game history data and the at least one rule for controlling interactions between anonymous users and the at least one other user. The game may be a casino-type game, such as poker, blackjack, craps, roulette, and baccarat.

37 Claims, 3 Drawing Sheets

U.S. PATENT DOCUMENTS

| | | | | |
|---|---|---|---|---|
| 2005/0137006 | A1 | 6/2005 | Rothschild | |
| 2005/0273418 | A1 | 12/2005 | Campbell | |
| 2006/0041498 | A1 * | 2/2006 | Hausman et al. | 705/37 |
| 2006/0052153 | A1 | 3/2006 | Vlazny | |
| 2007/0005484 | A1 * | 1/2007 | Waelbroeck et al. | 705/37 |
| 2007/0219882 | A1 * | 9/2007 | May | 705/35 |

FOREIGN PATENT DOCUMENTS

| | | |
|---|---|---|
| WO | WO 01/98961 | 12/2001 |
| WO | WO 02/01437 | 1/2002 |

OTHER PUBLICATIONS

Examiners $2^{nd}$ Report for AU Application No. 2010219359 dated May 26, 2011; 3 pages.

PCT Search Report for International Application No. PCT/US2007/067647; 3 pages; Nov. 2, 2007.

EP Extended Search Report for EP Application No. 07761470.9 dated Jun. 15, 2012; 5 pages.

* cited by examiner

SYSTEMS AND METHODS FOR MAINTAINING ANONYMITY IN A GAMING OR OTHER ENVIRONMENT

The present application claims priority to U.S. Provisional Patent Application No. 60/745,841, filed Apr. 27, 2006, which is hereby incorporated herein by reference.

DETAILED DESCRIPTION OF THE INVENTION

Figure 1:
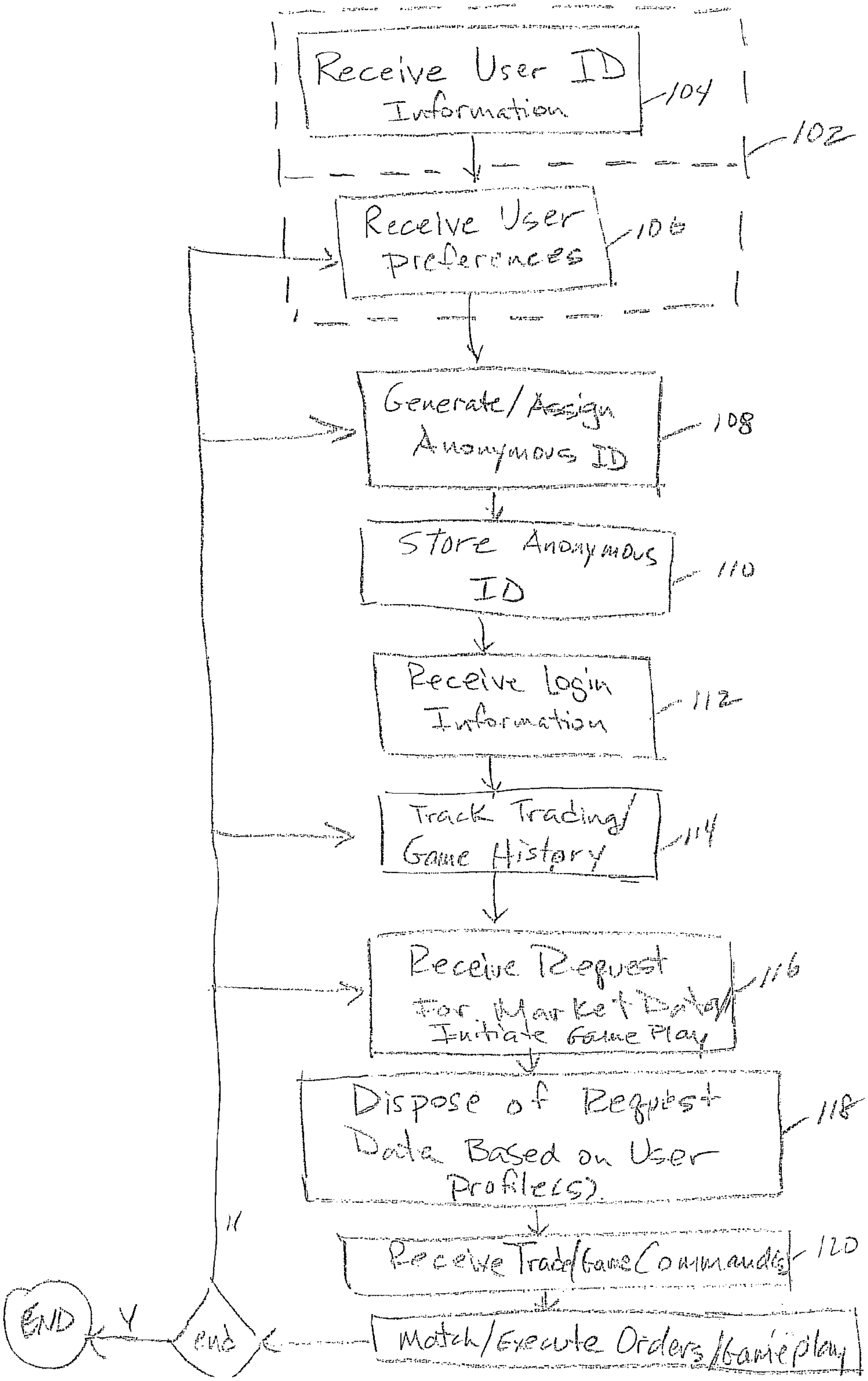
FIG. 1 depicts a flow diagram according to at least one embodiment of the methods disclosed herein.

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology Are Not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth□, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intelg Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112 Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function hat is a method, one structure for performing this method includes a computing device (e.g., a general purpose computer) that is programmed and/or configured with appropriate hardware to perform that function. Also includes a computing device (e.g., a general purpose computer) that is programmed and/or configured with appropriate hardware to perform that function via other algorithms as would be understood by one of ordinary skill in the art.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. Incorporation By Reference

Any patent, patent application or other document referred to herein is incorporated by reference into this patent application as part of the present disclosure, but only for purposes of written description in accordance with 35 U.S.C. §112, paragraph 1 and enablement in accordance with 35 U.S.C. §112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

Banks and other entities may offer trade execution to their customers through a plurality of portals, including the entities' own trading systems or systems, and various electronic communication networks (ECNs). This, however, allows individuals that trade with these entities to make profits at the entities' expense by exploiting loopholes inherent in multiple portal setups, such as by using system arbitrage strategies to buy an instrument on one system and then quickly sell it back to the same entity on another system that updates itself a fraction of a second slower. In an effort to weed out these types of individuals, some of these entities have decided to trade only with approved individuals with know identities. As a result, these entities may forgo a level of business with individuals that, e.g., prefer or are required to keep their identities anonymous. The same may occur in other environments where anonymity may be desired by some or all of the participants, such as in networked gaming environment, e.g., poker, blackjack, etc., that allows anonymous game play.

Accordingly, methods and systems are provided herewith that allow entities, such as banks and gaming providers, and/or the individuals interacting with these entities or with other individuals to filter out unprofitable counter parties, e.g., traders that may be using arbitrage strategies, without necessarily turning away all anonymous counter parties. In at least one embodiment of the methods and systems disclosed herein, this may be accomplished with anonymous identifiers assigned to at least those individual that want to remain anonymous. Individuals may therefore identify counter parties using the system that they may not want to interact with based on the anonymous one or more identifiers assigned thereto without realizing the true identify of the anonymous counter party. Anonymous identifiers may be communicated to system users in various ways. For example, the anonymous identifier may be displayed in a market display interface that identifies the source or orders displayed therein using the anonymous identifier(s). Similarly, in a gaming environment, opponents may be identified with the anonymous identifier(s), e.g., displayed at the opponent's position in the gaming display.

Alternatively or additionally, users electing to interact with anonymous counter parties may be given trading or game play information relating or otherwise involving particular anonymous users. This information may be used to control, e.g., display, hide, highlight, allow, and/or or block, transactions with certain anonymous opponents. In at least one embodiment, the trading information includes trade history data, such as information regarding executed trade orders. In the gaming environment, game play information may include game history data, such as information regarding the outcome of completed games. The trade history data may be specific in that the data is limited to or based on interactions with and between a particular the anonymous users and, e.g., the particular trader requesting market or other data there from, or general in that the data is not limited to or based on interactions with or between any one particular trader. Game history data may similarly be specific or general.

Trade and game history data (specific or otherwise) may be used to classify anonymous users in one of a plurality of tiers. The tier associated with a particular anonymous user may then be used controls transactions therewith. Each tier may also be associated with a predetermined price level for which an anonymous user is allowed to trade or wager, as the case may be. Tier information may be communicated to users in a market display or a gaming display interface screen.

In at least one embodiment, methods and systems are disclosed herein for maintaining anonymity in a gaming environment that include or perform the step or steps of receiving a user preference from a first user for maintaining an identity of the first user anonymous during at least one game; tracking game play involving the first user and at least one other user; receiving a request from the at least one other user to initiate at least one game with the first user; retrieving game history data specific to the first user and the at least one other user; retrieving at least one rule for controlling interactions between anonymous users and the at least one other user in the gaming environment; and disposing the request to initiate the at least one game with the first user based at least on the game history data and the at least one rule for controlling interactions between anonymous users and the at least one other user. The game may be a casino-type game, such as poker, blackjack, craps, roulette, and baccarat In at least one embodiment, at least one anonymous identifier is assigned to the first user and the request to initiate the at least one game is disposed by highlighting the at least one anonymous identifier assigned to the first user in the game. Game play may be initiated between at least the first user and the at least one other user; and at least one interface screen may be displayed for at least the first user and the at least one other user to play the at least one game.

In at least one embodiment, a plurality of anonymous identifiers are assigned to the first user and the request to initiate the at least one game is disposed by highlighting at least one of the plurality anonymous identifiers assigned to the first user in the game. The plurality of anonymous identifiers may be assigned periodically or they may be assigned at a trigger event, such as each time the first user initiates game play. The request to initiate the at least one game may be at least one of blocking, hiding, and highlighting the first user in the game.

In at least one embodiment, methods and systems are provided that include or perform the step or steps of receiving a user preference from a first user for maintaining an identity of the first user anonymous in a trading system; tracking trade history involving at least the first user and at least one other user; receiving at least one order to trade an item from the first user; receiving a request for market data associated with the item from the at least one other user; retrieving trade history data specific to the first user and the at least one other user; retrieving at least one rule for controlling interactions between anonymous users and the at least one other user in the trading system; and disposing the request for market data based at least on the trade history data and the at least one rule for controlling interactions between anonymous users and the at least one other user.

At least one anonymous identifier may be assigned to the first user and the request for market data may be disposed by at least one of blocking, hiding, and highlighting orders originating from the first user. The at least one anonymous identifier assigned to the first user may be communicated to the at least one other user and the request for market data may be disposed by at least one of hiding and highlighting the at least one anonymous identifier.

Trade history data may include data regarding executed orders between the first user and the at least one other user, such as an indication that at least one executed orders resulted in a gain or loss, whether a pair of executed orders for an item occurred within a certain time from each other, etc.

In at least one embodiment, first user may be classified as belonging to one of a plurality of tiers, and the request for market data may be disposed based on inclusion of the first user in one of the plurality of tiers. A first of the plurality of tiers may have at least one rule associated therewith for controlling interactions between anonymous users and the at least one other user, and a second of the plurality of tiers may have at least one other rule associated therewith for controls interactions between anonymous users and the at least one other user. In this instance, orders originating from first tier anonymous users may be disposed differently than orders originating from second tier anonymous users. Parameters for classifying the first user are specified by the at least one other user.

In at least one embodiment, classification is based at least on a cumulative grading scheme that accounts for at least one of a number of and a severity associated with the at least one rule for controlling interactions between anonymous users and the at least one other user that the trading history data either satisfies or fails.

Market data, e.g., data for pending orders originating from at least one anonymous user and at least one non-anonymous user for the item may be communicated to the at least one other user. Trade history data involving the first user and at least one other user, such as of a number of executed orders and profitability as between the first user and the at least one other user, may also be communicated to the at least one other user.

Referring to FIG. 1, a method 100, according to at least one embodiment of the methods disclosed herein, begins at 102 by setting up an account for at least one user. Account setup may be performed in a variety of ways. In one embodiment, account setup includes receiving at 104 user identification information, such as the user's name, tax ID or social security number, address, affiliations, biometric data, password, etc. User identification information is preferably stored in a data file or records, e.g., in one or more databases, for later use, such as for user authentication, e.g., during system login.

User preferences may be received at 106 at account setup or at any other time. User preference may include indications as to whether the particular user wants to remain anonymous and/or is willing to interact with other anonymous users. The preferences may be user specific. That is, the user may indicate particular users, e.g., with the anonymous identifiers, that the user is or is not willing to interact with. Alternatively or additionally, the user may indicate his willingness to interact with anonymous users based on their inclusion in one of a plurality of tiers and may also specify parameters for inclusion in the tiers. The user preferences may be stored in a user profile data file or record, e.g., in one or more databases, also for later use.

In at least one embodiment, an anonymous identifier is generated and/or assigned at 108 to the particular user. This may be accomplished in a variety of ways. The anonymous identifier may be a subset of a set of alphanumeric characters and/or images, which may be generated randomly or otherwise. A user may also be assigned an anonymous identifier by the system provider, e.g., by the bank. Alternatively, the user may provide the anonymous identifier to the system provider. In any event, the anonymous identifier may be stored at 110 in one or more user profiles associated with the user, e.g., in one or more databases, for later use. The anonymous identifier may be assigned once, e.g., at account setup, or more than once, e.g., periodically, to further ensure anonymity. For example, an anonymous identifier may be generated monthly, weekly, daily, etc., or more frequently and/or non-periodically, such as each time the anonymous user submits a trade order, logs into the system, begins a gaming session, etc. Multiple anonymous identifiers may be stored at 110 in one or more data files or records associated with the particular user. Multiple anonymous identifiers are preferably cross-referenced with each other to maintain ID continuity at least one for the system provider.

The anonymous identifier and/or the trade orders originating from the anonymous user associated with those particular anonymous identifiers may be disclosed only to other system users that elect to interact with anonymous counter parties. In this instance, users electing to trade with anonymous users benefit from the additional liquidity contributed by anonymous traders. In the gaming environment, players that elect to play with anonymous opponents have a greater pool of opponents to play and/or wager against. Alternatively, liquidity from anonymous users may be disclosed to all traders, including those that elect not to trade with anonymous counter parties. Liquidity from anonymous traders may be highlighted for easy identification. For example, orders from anonymous traders may be set in bold, underlined, italicized, color coded, etc., or a plurality thereof. Anonymous opponents in the gaming environment may similarly be highlighted for easy identification.

In one embodiment, the methods disclosed herein are applied to foreign exchange trading. For example, foreign exchange traders who wish to stay anonymous may be assigned an anonymous identifier or identifiers, and other traders may elect whether to trade currencies with these anonymous traders in foreign exchange trading systems. Therefore, in this context trade, orders may include bids, offers, buys, sells, etc., to trade particular currencies. However, the systems and methods disclosed herein are equally applicable for trading of any other financial instrument and are thus not limited thereto. The term "financial instrument" denotes any instrument, issued by a corporation, government, or any other entity, that evinces dept or equity, and any derivative thereof, including equities, stocks, fixed income instruments, bonds, debentures, certificates of interest or deposit, warrants, options, futures, forwards, swaps, or generally any security.

In at least one embodiment, a user may login to the system at some time following account setup. Login may be accomplished in a variety of ways. In one embodiment login includes receiving login information at 112. The login information may be any information for use in authenticating a user and providing thereto one or more of the functions disclosed herein. The login information may be, for example, a user ID, password, biometric data, etc. The login information may be submitted by a user with a user interface screen that includes therein at least one form element, such as an input field or text box, a drop down list, check box, radio buttons, action buttons, clickable images, etc., for entering login data. Following submission, the login information may be compared with previously obtained information and access to one or more of the functions may be provided based on a positive match. The login generally initiates a session in which authentication persists until the end of the session, e.g. logoff.

In at least one embodiment, the system tracks at 114 the users interactions with the other users. That is, the system may track a trader's trading history or a players gaming history. The system may store trading history including information regarding executed as well as non-executed orders. Various types of trade history information may be tracked, such as financial instrument name/identifier, price, execution time, volume or size, whether a sale or a purchase, whether a pair of transactions occurring within a certain time from each other, e.g., for a common type of financial instrument, result in a gain or a loss, and the counter party for executed trades. In the gaming environment, the system may track game history, such as win/loss and wagering statistics. The statistics may be game specific and/or particular counter party specific. Transactions with anonymous counter parties may reflect the anonymous identifier associated with the particular anonymous counter party. Trading and game history data may be stored in user profile data files or records, e.g., in one or more one or more databases.

As noted above, transaction information may be used by users and/or the system provider to control transactions and/or the level of interaction with anonymous users. For example, orders originating from particular anonymous traders may be dealt with, e.g., made hidden, highlighted, blocked, etc., or a combination thereof, based on the trading history data for the anonymous trader. The manner in which orders are handled in this respect may be dictated or specified by the system provider and/or other users. That is, the system may block orders from anonymous users that appear to have used arbitrage strategies with one or more other users a predetermined number of times, e.g., 1-10, etc. Similarly, any user may block orders from being communicated thereto from anonymous users that appear to have used arbitrage strategies, in general or in previous transactions with the user a predetermined amount of times, e.g., 1-5, etc., consecutive or otherwise. Control rules for handling orders from anonymous users may be stored in a user profile file or data record for later use.

In the context of the gaming environment, opponents may be identified blocked, highlighted, hidden, etc., based on the game history data for the anonymous opponent. The user and/or the system provider may specify the manner in which opponent interaction is handled. In this respect, users may readily identify potentially problematic opponents, generally or specifically therewith, without necessarily realizing their true identity.

In at least one embodiment, a request for market data is received at 116. The request may then be disposed at 118 based on the user preferences. In one embodiment, disposable includes communicating market data to the requesting user. Market data includes any and all data relating to a market for an item, such as one or more bid and/or ask prices, yields, sizes, originating party, etc., real time or otherwise. The total set of market data for the item may include data for pending orders from one or more anonymous traders, and from one or more non-anonymous traders. As discussed herein, users may be able herewith to control the manner in which they interact with anonymous users. As such, the system may communicate the requested market data according to the controls set up by the particular user and/or the system provider. This may be accomplished in a variety of ways. In one embodiment, the system references control rules from one or more data files, e.g., in a user profile(s), and presents the market data based thereon. As can be appreciated, a plurality of users may each have their own preferences. In this instance, the system will reference control rules specified by each of the plurality of users, e.g., in a plurality of user profiles, and communicate market data thereto based on each user's controls. In one embodiment, market data communicated to the requesting user causes an interface screen to be displayed that contains market data based on the user and/or system specified controls.

In the context of the gamin environment, a request for a networked game may be received and the gaming system may dispose of the request by determining potential opponents based on control rules set by the user and/or the system provider. A list of available users may then be communicated to the requesting user based on the control rules. The list may block, hide, highlight, etc., certain anonymous opponents that do not satisfy the control criteria.

Various control rules may be implemented in accordance with the methods and systems disclosed herein. Control rules generally test at least one parameter associated with an order for an item and/or the originating trader, and dictate the manner in which those orders will be handled with. Users may, for example, control interactions with anonymous traders by testing whether orders originate from anonymous users and at least one of block, hide, highlight, etc., orders based thereon. Similarly, users may control interactions based on the trade history or habits of the originating anonymous user. For example, the control rules may test whether orders originate from anonymous users that have shown to be unprofitable and/or may have used arbitrage strategies previously, either with the specific requesting trader or in general with other traders. Orders originating from these users may similarly be blocked, hidden, highlighted, etc.

Profitability may be based on the number and/or magnitude of the loss/gain on individual orders, a plurality of orders, or all of the orders, e.g., executed between the requesting user and the anonymous user. Use of arbitrage strategies may be suspected based on the difference in the execution time of two orders for an item, executed between the requesting user and the anonymous trader or any two traders occurring within a predefined time, e.g., 1, 2, 3, . . . 30, etc. seconds.

In the context of the gaming environment, control rules may test the gaming history of the anonymous user and dictate the level of interaction with the anonymous user. Users may test win/loss statistics for particular anonymous users and at least one of block, hide, highlight, etc., anonymous users attempting to wager with other users based thereon.

As noted above, users may be classified into one of a plurality of tiers. Control rules may therefore be implemented that are tier specific. That is, control rules may be used to control the manner in which all orders/anonymous users falling within a tier are dealt with. For example, tier 1 orders/users may be blocked, tier 2 may be hidden, tier 3 may be highlighted, etc.

The position of an order/user within the classification scheme may be determined using a cumulative grading scheme. That is, orders/users may be graded based on the number and severity of the control rules that are either satisfied or failed. For example, an order from an anonymous trader (+30) that has proven to be unprofitable to at least one other trader in five previous transactions (+50) and profitable to at least one other trader in two transactions (+20) may receive a score of (30+50−20=10). Similarly, an order from an anonymous trader (30) that has executed ten common trader orders (five profitable order pairs) for the same item within two seconds of each order in the pair (75) and three profitable order pairs within three seconds of each order in the pair (30) may receive a score (30+75+30=135).

Tier 1 may include orders having scores 0-30, tier 2 may include orders having scores 31 to 60, and tier 3 may include orders having scores greater than 60. Tier classifications may be user or system or user specified and stored in one or more data files or records for later use. Tier classification/grade may further take into account the magnitude of the losses or gains, the size of the pending orders/wagers, the volume of executed orders, etc., or any ratio or combination of the variables discussed herein. As can be appreciated, various scoring schemes may be implemented in this respect. Accordingly, the methods and systems disclosed herein are not limited to any one implementation.

Traders receiving market data may act on the orders communicated thereto. In this instance, the system may receive at 120 a trading command from the trader. The trading command may be a counter side buy or sell order of any one of the orders communicated thereto, a bid, an offer, etc. Bids and offers may be limit or market orders in which instance the system may match the bids and offers received at 122 with pending offers and bids, respectively, in accordance with the control rules specified either by the user and/or the system provider. For example, traders may limit order matching against those that receive a certain score or belong to one or more tiers. Orders acted on with a buy or sell command and matched orders may be executed at 124 and removed from the market order queue. Some or all of the steps iterated herein may be repeated during the login session and for other users.

In the gaming environment, users may accept game play with certain anonymous opponents. In this instance, the system may receive a command to initiate game play with the identified users and initiate a gaming session between the users, e.g., for the users to interact and/or wager in one or more networked games, such as casino-style games, e.g., poker, blackjack, craps, roulette, baccarat, etc., as well as other games, e.g., the wheel of fortune; keno, sports betting, horse, dog, or auto racing, jai alai, lottery-type games, etc.

As discussed above, the contents of user's profile(s) may include trading information, such as the profits generated and/or the losses sustained to, e.g., the bank from trades entered into with a particular customer, trader, and/or user, the liquidity provided by that user (volume) and/or other parties they have traded with the user. An anonymous identifier may be part of the user's profile as well.

In the context of a bank/customer relationship, in certain embodiments, a bank may allow a particular customer to trade or may choose to trade with the customer based on that particular customer's profile. More specifically, the bank may assign the customer an anonymous identifier such as a customer number and track the trading history associated with the assigned identifier. Customers who are willing to trade with anonymous counter parties may be given access to some of the trading history associated with anonymous identifiers, and thus may choose whether to trade with a particular customer. The portion of the information that may be made available to such customers may be the liquidity provided by the anonymous customers. Similarly, the bank may opt to not trade with a particular customer if the trading history or habits associated with that particular identifier becomes unfavorable to the bank. For example, if trades with a single customer have resulted in certain losses to the bank that are greater than a predetermined amount or that are not offset by enough profits, then the bank may refuse to allow this customer to trade. These rules may similarly be applied by other customers or system users.

Customers who are willing to trade with anonymous counter parties may be provided with information relating to the anonymous user. Such information may be characterized by the absence of the user's identity. The user may attempt to submit trading instructions that are received by the trading system. A trade may be executed at least based on the information and the trading instructions. Customers may track trades entered into with anonymous counter parties through identifiers associated therewith and thus may choose whether to trade with a particular customer depending on the outcome of such trades. For example, customers may opt to not trade with a particular counter party if their trading history associated with an identifier for that counter party becomes unfavorable.

In some embodiments, a bank may classify customers in different tiers based on their respective profiles. Each tier may be associated with a set of conditions or rules that have to be met by the customer who is classified in the tier in order for the customer to enter in to trades. For example, each tier may be associated with a different set of prices below or above which, the bank is unwilling to allow the customer to trade. As more trades are entered into with different customers, the bank may reclassify these customers into the different tiers. Depending on the tier in which a particular customer is classified, the bank may allow the customer to trade at, for example, a particular price, or may simply not allow the customer to trade at all. With regard to the functionality discussed above, the bank role may be fulfilled by any system provider or any other trader/user. Similarly, the role of the customer may be fulfilled by other traders/users and system providers. Accordingly, the methods and system discussed herein are not limited thereto.

Figure 2:
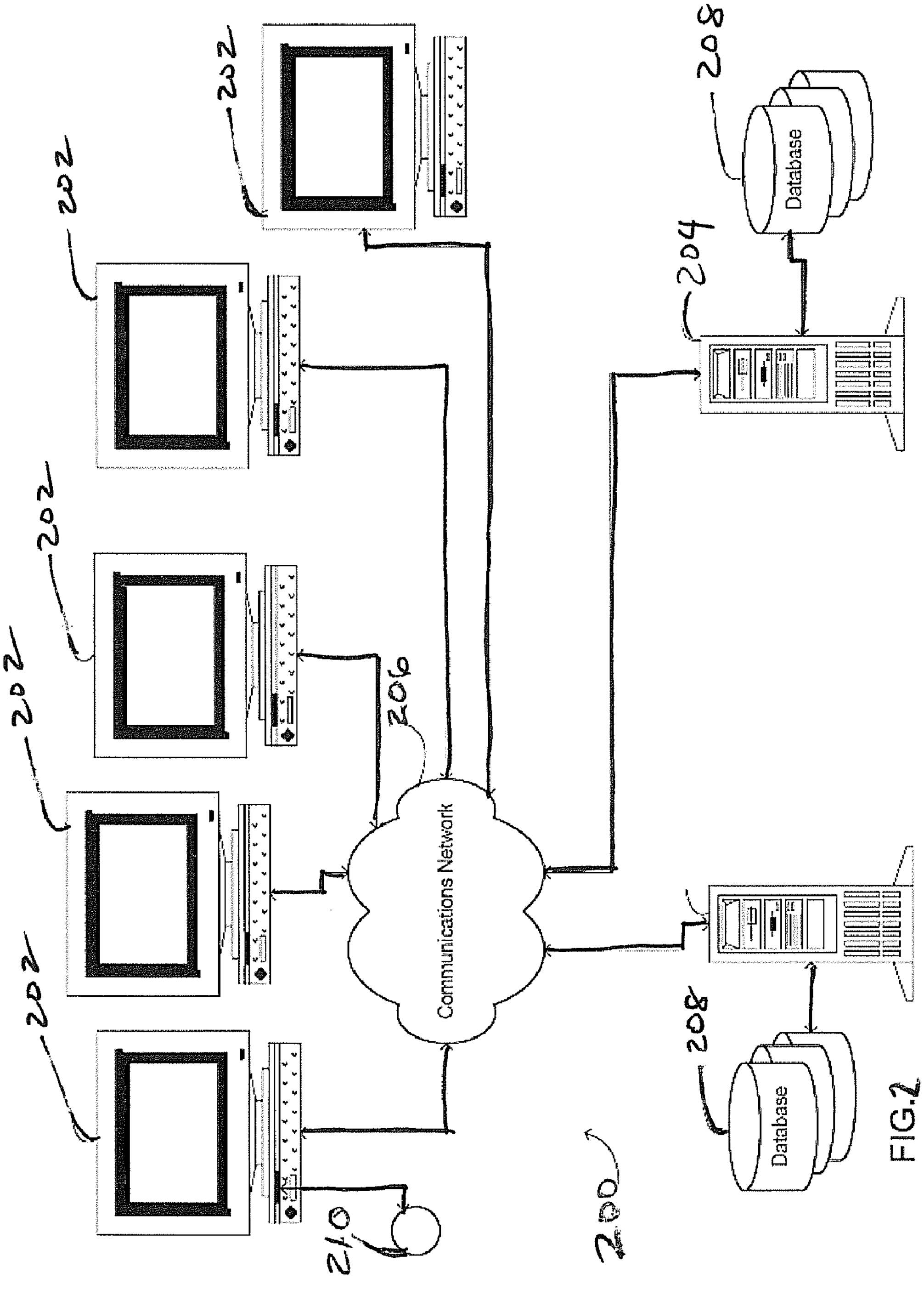
FIG. 2 depicts a system according to at least one embodiment of the systems disclosed herein.

Referring to FIG. 2, the methods disclosed herein may be implemented in an electronic trading/gaming system 200 that may include at least one computing device, such as one or more local or remote client device 202, a server computer 204, or a combination thereof. The one or more client device s may be coupled over at least one communication network 206 to the server computer 204. The server 204 may be linked to a back office clearing center.

The computing device generally includes at least one processor, and a memory, such as ROM, RAM, FLASH, etc., including computer readable medium type memory, such as a hard drive, a flash-drive, an optical or magnetic disk, etc. The memory or computer readable medium preferably includes software stored thereon that when executed performs one or more steps of the methods disclosed herein, including communicating data and commands back and forth between the computers, displaying interface screens, etc. The computers may also be associated with or have access to one or more databases 208 for retrieving and/or storing the various types of data and/or user profile(s) discussed herein.

The server computer 204 may be any suitable server, processor, memory, computer (special purpose or otherwise), data processing device, or combination thereof that is used to implement the governing logic that processes orders and executes trades communicated from various client device s, and distributes trade and market information, including price and size information, and anonymous identifiers to the client device s, as well as the other information disclosed herein. The computer network may include the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of the same.

The client devices 202 may be personal computers, laptop computers, mainframe computers, dumb terminals, data displays, Internet browsers, Personal Digital Assistants (PDAs), two-way pagers, wireless terminals, portable telephones, etc., or any combination of the same. These client devices may be used by participants, such as anonymous users to enter bid, ask, buy, and sell orders for the items being traded, etc., and view market activity corresponding to these items. The client device 202 may run a trading application in accordance with the principles disclosed herein and may be used to enter orders with anonymous traders on desired items and to execute and monitor trades. The back office clearing center may be any suitable equipment, such as a computer, a laptop computer, a mainframe computer, etc., or any combination of the same, for causing trades to be executed, e.g., settled and/or verifying that trades are settled. In the context of the gaming environment, the client device 202 may be user to communicate gaming commands and interact with other users in one or more games supported by the system.

In at least one embodiment, the client device 202 includes or is otherwise associated with at least one biometric sensor 210. The biometric sensor is any device that is used to determine directly from the user at least one item of biometric data associated with a user, such as a fingerprint reader, an iris scanner, a retinal scanner, a vascular pattern reader, a facial recognition camera, etc. The biometric sensor may be embodied in hardware, software, or a combination thereof. The biometric sensor may further share resources with other components of the system.

Biometric data is generally obtained with the biometric sensor and may be used at least to authenticate the identity of the user as a gateway for allowing the user to access the system's functionality. In this regard, biometric data may be compared with previously obtained/stored biometric data that has preferably been verified as being associated with a particular user and access to the system's functionality may be provided based on a positive match thereof.

Figure 3:
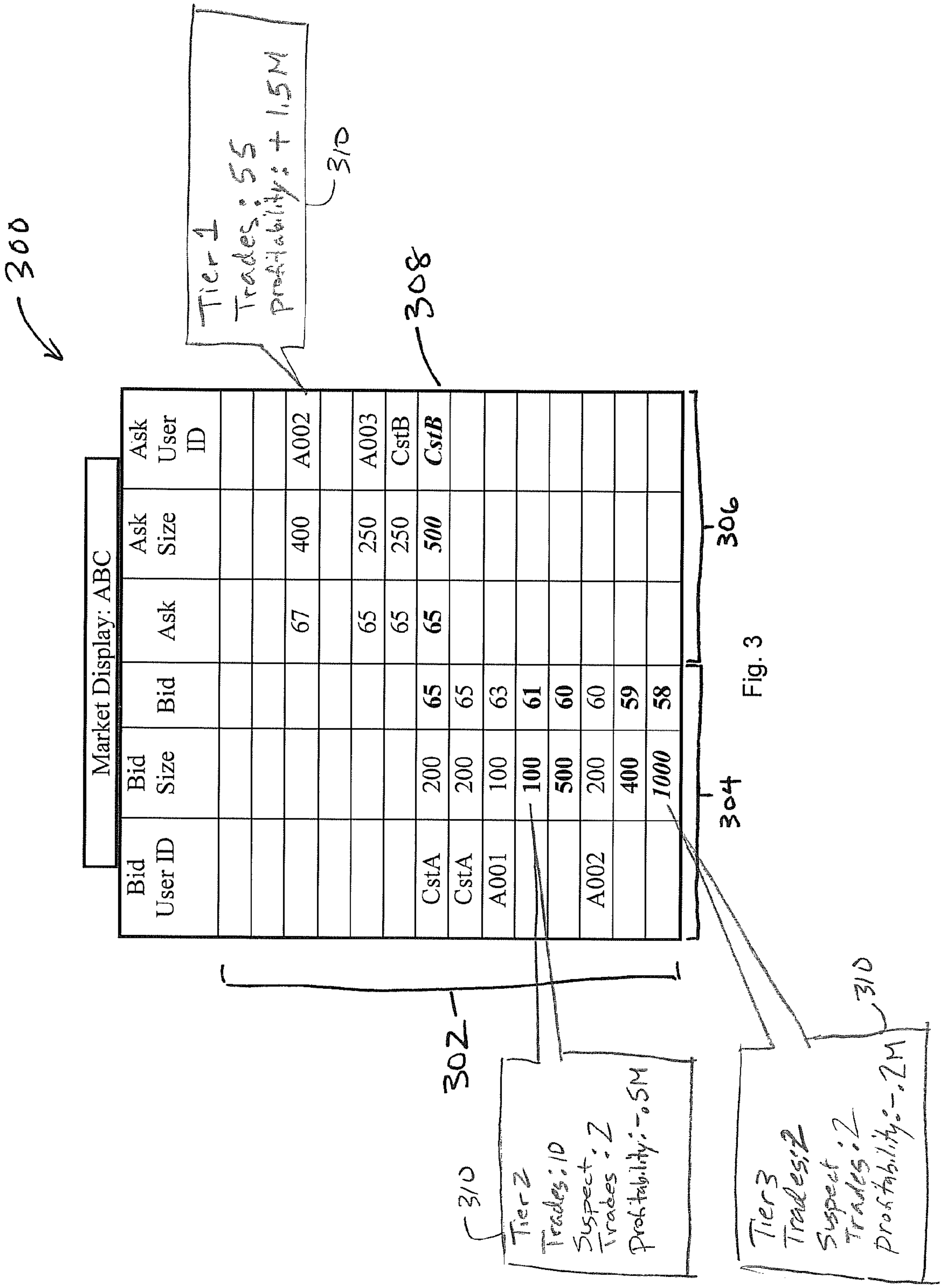
FIG. 3 depicts an interface screen for use in at least in one of the embodiments of the methods and systems disclosed herein.

Referring to FIG. 3, a market display interface screen 300 according to one embodiment includes therein market data 302 for at least one item. The market data may be arranged in a variety of ways. In one embodiment, bid and ask data are logically separated, e.g., in columns 304, 306. Best bid and offer data may be displayed in a common row 308 with bids and offers stacked in a queue in opposing directions from the best bid and offer row. As noted above, the market display may be displayed based on the controls set up by the user and/or the users. For example, anonymous origination may be indicated with the anonymous identifier displayed with the order originating there from, such as A001-A003. Anonymous origination may also be indicated by leaving the Bidder/User ID empty. Blocked orders may be excluded from the market display or they may be hidden in that they appear as a blank row between orders. Tiers may be indicated by locking, hiding, and/or highlighting orders. For example, tier 1 orders may be shown in normal font, tier 2 may be shown in bold, and tier 3 may be shown in bold and italics.

Similarly, tier information may be displayed with the orders, e.g., in an adjacent cell or popup window 310. Statistics between the requesting user and the order originator may similarly be displayed, e.g., in an adjacent cell or popup window 310. The popup window may be displayed when, for example, the requesting user moves a pointer over the order in the market display. Orders in the queue may generally be arranged by price (best to worst) and then by time received.

Tier and statistics may similarly be displayed in the gaming interface screen. That is, tier information and statistics between the requesting user and the opponent may be displayed adjacent to the opponent or in a popup window.

One of ordinary skill in the art should appreciate that the methods and systems of the present application may be practiced in embodiments other than those described herein. It will be understood that the foregoing is only illustrative of the principles of the invention, and that various modifications can be made by those skilled in the art without departing from the scope and spirit of the invention or inventions disclosed herein.

What is claimed is:

1. A method comprising:

receiving, by at least one processor, a user preference from a first user for maintaining an identity of the first user anonymous in a trading system;

tracking, by the at least one processor, trade history involving at least the first user and at least one other user;

receiving, by the at least one processor, at least one order to trade an item from the first user;

receiving, by the at least one processor, a request for market data associated with the item from the at least one other user;

responsive to the act of receiving the request for market data, determining, by the at least one processor, trade history data based on the trade history, the trade history data comprising information specific to the first user and the at least one other user, in which the act of determining the trade history data comprises determining whether a pair of executed orders for an item occurred within a predetermined time from each other;

retrieving, by the at least one processor, at least one rule for controlling interactions between anonymous users and the at least one other user in the trading system; and disposing, by the at least one processor, the request for market data based at least on (1) the act of determining whether a pair of executed orders associated with the first user occurred within a predetermined time from each other and (2) the at least one rule for controlling interactions between anonymous users and the at least one other user.

2. The method of claim 1, further comprising assigning at least one anonymous identifier to the first user and wherein disposing the request for market data comprises at least one of blocking, hiding, and highlighting orders originating from the first user.

3. The method of claim 2, further comprising communicating to the at least one other user the at least one anonymous identifier assigned to the first user and wherein disposing the request for market data comprises at least one of hiding and highlighting the at least one anonymous identifier.

4. The method of claim 1, wherein the trade history data comprises data regarding executed orders between the first user and the at least one other user.

5. The method of claim 4, wherein the data regarding executed orders between the first user and the at least one other user comprises an indication that at least one executed orders resulted in a gain or loss.

6. The method of claim 4, wherein the data regarding executed orders between the first user and the at least one other user comprises (1) an indication that at least one executed orders resulted in a gain or loss and (2) an indication whether a pair of executed orders for an item occurred within a certain time from each other.

7. The method of claim 1, further comprising classifying the first user as belonging to one of a plurality of tiers, and wherein the request for market data is disposed based on inclusion in one of the plurality of tiers.

8. The method of claim 7, wherein a first of the plurality of tiers has at least one rule associated therewith for controlling interactions between anonymous users and the at least one other user, and a second of the plurality of tiers has at least one other rule associated therewith for controls interactions between anonymous users and the at least one other user, and wherein orders originating from first tier anonymous users are disposed differently than orders originating from second tier anonymous users.

9. The method of claim 7, wherein parameters for classifying the first user are specified by the at least one other user.

10. The method of claim 7, wherein classification is based at least on a cumulative grading scheme that accounts for at least one of a number of and a severity associated with the at least one rule for controlling interactions between anonymous users and the at least one other user that the trading history data either satisfies or fails.

11. The method of claim 1, further comprising communicating to the at least one other user market data for the item, wherein the market data comprises data for pending orders originating from at least one anonymous user and at least one non-anonymous user.

12. The method of claim 1, wherein disposing the request to for market data comprises communicating to the at least one other user trade history data involving the first user and at least one other user.

13. The method of claim 12, wherein the trade history data comprises at least one of a number of executed orders and profitability as between the first user and the at least one other user.

14. The method of claim 1, in which the act of tracking trade history comprises storing information about at least one transacted trade to which the first user and the at least one other user were counterparties.

15. The method of claim 1, in which the trade history data comprises information about the at least one completed trade to which the first user and the at least one other user were counterparties.

16. A system comprising:

at least one computing device; and at least one memory having instructions stored thereon which, when executed by the at least one computing device, direct the at least one computing device to:

receive a user preference from a first user for maintaining an identity of the first user anonymous in a trading system;

track trade history involving at least the first user and at least one other user;

receive at least one order to trade an item from the first user;

receive a request for market data associated with the item from the at least one other user;

responsive to the act of receiving the request for market data, determine trade history data based on the trade history, the trade history data comprising information specific to the first user and the at least one other user, in which the act of determining the trade history data comprises determining whether a pair of executed orders for an item occurred within a predetermined time from each other;

retrieve at least one rule for controlling interactions between anonymous users and the at least one other user in the trading system; and dispose the request for market data based at least on (1) the act of determining whether a pair of executed orders associated with the first user occurred within a predetermined time from each other and (2) the at least one rule for controlling interactions between anonymous users and the at least one other user.

17. The system of claim 16, in which the instructions, when executed by the at least one computing device, further direct the at least one computing device to assign at least one anonymous identifier to the first user and wherein disposing the request for market data comprises at least one of blocking, hiding, and highlighting orders originating from the first user.

18. The system of claim 17, in which the instructions, when executed by the at least one computing device, further direct the at least one computing device to communicate to the at least one other user the at least one anonymous identifier assigned to the first user and wherein disposing the request for market data comprises at least one of hiding and highlighting the at least one anonymous identifier.

19. The system of claim 16, wherein the trade history data comprises data regarding executed orders between the first user and the at least one other user.

20. The system of claim 19, wherein the data regarding executed orders between the first user and the at least one other user comprises an indication that at least one of the executed orders resulted in a gain or loss.

21. The system of claim 19, wherein the data regarding executed orders between the first user and the at least one other user comprises (1) an indication that at least one executed orders resulted in a gain or loss and (2) an indication whether a pair of executed orders for an item occurred within a certain time from each other.

22. The system of claim 16, in which the instructions, when executed by the at least one computing device, further direct the at least one computing device to classify the first user as belonging to one of a plurality of tiers, and wherein the request for market data is disposed based on inclusion in one of the plurality of tiers.

23. The system of claim 22, wherein a first of the plurality of tiers has at least one rule associated therewith for controlling interactions between anonymous users and the at least one other user, and a second of the plurality of tiers has at least one other rule associated therewith for controls interactions between anonymous users and the at least one other user, and wherein orders originating from first tier anonymous users are disposed differently than orders originating from second tier anonymous users.

24. The system of claim 22, wherein parameters for classifying the first user are specified by the at least one other user.

25. The system of claim 22, wherein classification is based at least on a cumulative grading scheme that accounts for at least one of a number of and a severity associated with the at least one rule for controlling interactions between anonymous users and the at least one other user that the trading history data either satisfies or fails.

26. The system of claim 16, in which the instructions, when executed by the at least one computing device, further direct the at least one computing device to communicate to the at least one other user market data for the item, wherein the market data comprises data for pending orders originating from at least one anonymous user and at least one non-anonymous user.

27. The system of claim 16, wherein the act of disposing the request to for market data comprises communicating to the at least one other user trade history data involving the first user and at least one other user.

28. The system of claim 27, wherein the trade history data comprises at least one of a number of executed orders and profitability as between the first user and the at least one other user.

29. The system of claim 16, in which the act of tracking trade history comprises storing information about at least one transacted trade to which the first user and the at least one other user were counterparties.

30. The system of claim 16, in which the trade history data comprises information about the at least one completed trade to which the first user and the at least one other user were counterparties.

31. The system of claim 16, in which the at least one other user comprises a second user, and in which the instructions, when executed by the at least one computing device, further direct the at least one computing device to:

determine from a plurality of price tiers a particular price tier that limits the amount the second user is allowed to trade via the system; and display to the first user, at a market display interface, the particular price tier of the at least one other user.

32. A non-transitory machine-readable medium having stored thereon a plurality of instructions which, when executed by at least one processor, direct the at least one processor to:

receive a user preference from a first user for maintaining an identity of the first user anonymous in a trading system;

track trade history involving at least the first user and at least one other user;

receive at least one order to trade an item from the first user;

receive a request for market data associated with the item from the at least one other user;

responsive to the act of receiving the request for market data, determine trade history data based on the trade history, the trade history data comprising information specific to the first user and the at least one other user, in which the act of determining the trade history data comprises determining whether a pair of executed orders for an item occurred within a predetermined time from each other;

retrieve at least one rule for controlling interactions between anonymous users and the at least one other user in the trading system; and dispose the request for market data based at least on (1) the act of determining whether a pair of executed orders associated with the first user occurred within a predetermined time from each other and (2) the at least one rule for controlling interactions between anonymous users and the at least one other user.

33. The system of claim 32, in which the instructions are further configured to:

based at least on the act of determining whether a pair of executed orders associated with the first user occurred within a predetermined time from each other, determine an indication that the first user used at least one arbitrage strategy in at least one previous transaction with one or more users; in which the act of disposing the request for market data comprises:

blocking the at least one order from the first user based on the determination of an indication that the first user used at least one arbitrage strategy in at least one previous transaction with one or more users.

34. The system of claim 32, in which the instructions are further configured to:

based at least on the act of determining whether a pair of executed orders associated with the first user occurred within a predetermined time from each other, determine an indication that the first user used at least one arbitrage strategy in at least one previous transaction with the at least one other user; in which the act of disposing the request for market data comprises:

blocking the at least one order from the first user based on the determination of an indication that the first user used at least one arbitrage strategy in at least one previous transaction with the at least one other user.

35. The system of claim 32, in which the instructions are further configured to:

based at least on the act of determining whether a pair of executed orders associated with the first user occurred within a predetermined time from each other, determine an indication that the first user used at least one arbitrage strategy in a predetermined number of a plurality of previous transactions; in which the act of disposing the request for market data comprises:

blocking the at least one order from the first user based on the determination of an indication that the first user used at least one arbitrage strategy in a predetermined number of a plurality of previous transactions.

36. The system of claim 32, in which the instructions are further configured to:

based at least on the act of determining whether a pair of executed orders associated with the first user occurred within a predetermined time from each other, determine an indication that the first user used at least one arbitrage strategy in a predetermined consecutive number of previous transactions; in which the act of disposing the request for market data comprises:

blocking the at least one order from the first user based on the determination of an indication that the first user used at least one arbitrage strategy in a predetermined consecutive number of previous transactions.

37. The system of claim 32, in which the instructions are further configured to:

based at least on the act of determining whether a pair of executed orders associated with the first user occurred within a predetermined time from each other, determine an indication that the first user used at least one arbitrage strategy in a predetermined consecutive number of previous transactions with the at least one other user;

in which the act of disposing the request for market data comprises:

block the at least one order from the first user based on the determination of an indication that the first user used at least one arbitrage strategy in a predetermined consecutive number of previous transactions with the at least one other user.

* * * * *